UNITED STATES PATENT OFFICE 2,690,407

METHOD OF PREVENTING ACCUMULATION OF STATIC CHARGES

Leopold Pessel, Whitemarsh, Pa., assignor to Radio Corporation of America, a corporation of Delaware No Drawing. Application May 25, 1951,
Serial No. 228,373

11 Claims. (Cl. 117—138.8)

This invention relates to an improved method of preventing the accumulation of charges of static electricity on articles made of synthetic resinous materials and to the products resulting from the practice of the improved process.

It is well known that articles made of synthetic resinous materials usually attract dust particles more rapidly than articles made of other materials, such as wood, because the former type of material tends to accumulate a surface charge of static electricity. Frequently, the problem is great enough to become highly annoying to the consumer who uses a product containing synthetic resin parts.

Various methods have been tried to prevent the accumulation of a static charge on surfaces of "plastics." One method has been to load the resinous material with conductive particles. While this may prevent the accumulation of static electricity, it often introduces complicating factors such as deterioration of appearance, higher cost, lower strength, and lower insulation value. Another method has been to apply to the resin surface thin films of certain materials such that electric charges are carried away without interfering with the insulation properties of the body.

Films of anti-static materials have been derived from many types of chemical compounds. Most frequently, these compounds are salt-like in nature or are hygroscopic. Most of them possess the great disadvantage of being water-soluble. A plastic part coated with a film of this type of material cannot be cleaned with a damp cloth without removing some of the protective film.

Another disadvantage of anti-static agents formerly used is that when they are permitted to dry, after being applied from a solution, visible deposits of fine crystals are formed.

One object of the present invention is to provide an improved method of preventing the accumulation of static electricity on the surfaces of articles made of synthetic resinous materials.

Another object of the invention is to provide an anti-static film that is water-insoluble.

Another object of the invention is to provide an anti-static film that is invisible.

Another object of the invention is to provide a synthetic resin product having a surface provided with an improved film for preventing the accumulation of static electricity.

Still another object of the invention is to provide novel solutions for applying improved anti-static films to plastic articles.

These and other objects will be more apparent and the invention will be more readily understood from the more specific description which follows.

In brief, the present invention comprises providing a surface of a synthetic resin article with a film of a composition consisting essentially of a partially hydrolyzed water-insoluble polyvinyl alcohol and an acetate of a long-chain amine, said chain containing from 6 to 18 carbon atoms. This film is applied from a solution of which the solvent is composed of 40–90% by volume alcohol and 10–60% by volume water. The solute consists essentially of 0.05–5% by weight (with reference to the weight of the solvent) of the partially hydrolyzed polyvinyl alcohol and 0.1–10% of the amine acetate.

Example

A solution suitable for coating plastic parts such as polystyrene radio dials is as follows:

| | |
|---|---|
| Isopropanol (91% grade) | 9464 cc. (2.5 gals.) |
| Distilled water | 9464 cc. (2.5 gals.) |
| Octadecyl amine acetate | 43 g. |
| Partially hydrolyzed polyvinyl alcohol (made by hydrolyzing polyvinyl acetate to the extent of about 43–50%) | 43 g. |

The part to be coated may first be cleaned with a clean, damp cloth and the above solution applied by spraying until the desired surface area is covered with a thin film of the liquid. The liquid is then permitted to air-dry leaving a thin, invisible film of the polyvinyl alcohol and amine on the part being treated.

Any plastic which is insoluble in the alcohol-water mixture may be coated as described. For example, besides polystyrene, the methacrylate resins, copolymers of polyvinyl chloride-acetate, cellulose derivatives, and the like, may be coated.

The solution may be applied by any convenient method such as spraying, brushing, or dipping.

The solvent may comprise any combination within the range 40–90% by volume alcohol and 10–60% by volume water. By alcohol is meant any of the low molecular weight, water-miscible alcohols such as methanol, ethanol (pure or denatured with ethyl acetate, acetone or the like), propanol, or iso-propanol.

The partially hydrolyzed polyvinyl alcohol is preferably made by partial hydrolysis of polyvinyl acetate or some other polyvinyl ester. The principal distinguishing characteristic of the polyvinyl alcohol suitable for use in this invention is substantial water insolubility. Polyvinyl alcohols having this property are commercially available. Preferably, their degree of hydrolysis is about 43–50% but, for purposes of this invention, the degree of hydrolysis may be higher so long as the product remains water-insoluble. This ingredient is present within the range of 0.05 to 5% by weight of the solvent in the solutions used to form the protective films of the present invention.

The amine acetate may be any one derived from a long chain fatty acid having a carbon chain length of 6–18. The derivatives which are preferred are those of fatty acids having carbon chain lengths of 16–18 carbon atoms. Examples of suitable compounds are the acetates of hexadecyl amine, octadecyl amine, octadecenyl amine, and octadecadienyl amine. The amine acetate is present in the amount of 0.1 to 10% by weight of the solvent.

It will be seen that in the dried film the partially hydrolyzed alcohol and the amine acetate are present within the range of ratios, one to the other, of 50 to 1 and 1 to 200.

Plastic parts coated with films, deposited as above described, have much less attraction for dust than the same parts not so treated. Moreover, their appearance is the same as if no film had been applied. Radio or television knobs, dials, dial covers, tube shields and the like, as well as any type of article made wholly or partly of a synthetic resinous material may be treated advantageously in accordance with the teachings of the present invention. The solutions from which the films are deposited have the property of excellent wetting of synthetic resinous surfaces so that uniform films can be produced by this method. The films are also water-insoluble so that the coated part may be washed with water or rubbed with a damp cloth without removing the protective film. This is an important advantage not possessed by most anti-static film-forming materials which have been used previously.

I claim as my invention:

1. An article comprising an alcohol-insoluble, synthetic resinous material having a surface film composed of a water-insoluble, partially hydrolyzed polyvinyl alcohol, and an acetate of a long chain amine, said amine having a carbon chain length of 6–18 carbon atoms and said polyvinyl alcohol and said amine being present within the ratios of 50 to 1 and 1 to 200.

2. An article according to claim 1 in which said resinous material is polystyrene.

3. An article according to claim 2 in which said acetate is the acetate of octadecylamine.

4. An article according to claim 3 in which said alcohol and said acetate are present in the ratio of 1 to 1.

5. A method of giving a surface of a body made of synthetic resinous material anti-static properties, said method comprising providing said surface with a film composed of a water-insoluble, partially hydrolyzed polyvinyl alcohol, and an acetate of a long chain amine of which the carbon chain contains 6–18 carbon atoms, said alcohol and said acetate being present within the range of ratios of 50 to 1 and 1 to 200.

6. A method according to claim 5 in which said carbon chain has a length of 16–18.

7. A method according to claim 6 in which said alcohol and said acetate are present in the ratio of 1 to 1.

8. A method of providing a surface of a body of synthetic resinous material with an anti-static film, said method comprising applying to said surface a film of a solution consisting essentially of a solvent comprising 40–90% by volume of a water-miscible alcohol and 10–60% by volume water and a solute consisting essentially of 0.05 to 5% by weight, with respect to said solvent, of a water-insoluble polyvinyl alcohol, and 0.1 to 10% by weight, with respect to said solvent, of an acetate of a 6–18 carbon chain amine, and evaporating said solvent to form a film of said solute.

9. A method according to claim 8 in which said solvent consists of equal parts by weight water and isopropanol.

10. A method according to claim 9 in which said solute consists of equal parts by weight of said polyvinyl alcohol and said acetate.

11. A method according to claim 10 in which said long chain amine contains 16–18 carbon atoms.

References Cited in the file of this patent

UNITED STATES PATENTS

| Number | Name | Date |
| --- | --- | --- |
| 2,086,544 | Dreyfus | July 13, 1937 |
| 2,177,484 | Fruth | Oct. 24, 1939 |
| 2,253,146 | Spanagel | Aug. 19, 1941 |
| 2,340,881 | Kelley et al. | Feb. 8, 1944 |
| 2,372,985 | Roth | Apr. 3, 1945 |
| 2,497,536 | Chandler | Feb. 14, 1950 |
| 2,532,400 | Fortess et al. | Dec. 5, 1950 |
| 2,543,539 | Wizon | Feb. 27, 1951 |